J. Lees,
Watch-Chain Attachment,
N⁰ 33,653.  Patented Nov. 5, 1861.
Fig: 1.  Fig: 2.  Fig: 3.  Fig: 4.
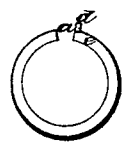 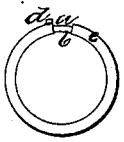  
Fig: 5.
Fig: 6.  Fig: 7.  Fig: 8.
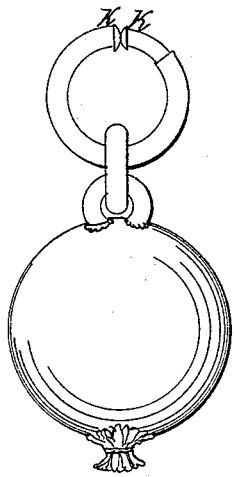 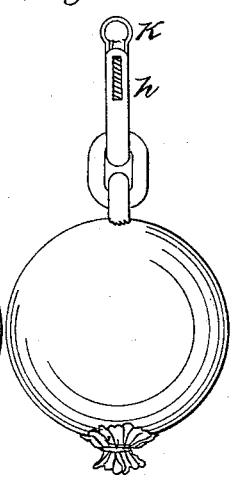 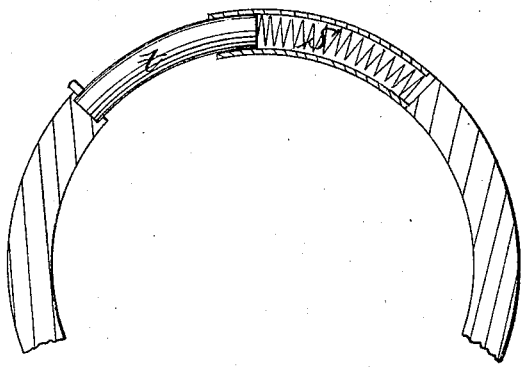
Witnesses:  
Thos R. Roach  
J. C. Teschemacher
Inventor:  
Josiah Lees  
By his Attorney  
Sam. Cooper

UNITED STATES PATENT OFFICE.

JOSIAH LEES, OF BIRMINGHAM, ENGLAND.

IMPROVEMENT IN SWIVEL HOOKS AND RINGS.

Specification forming part of Letters Patent No. 33,653, dated November 5, 1861.

*To all whom it may concern:*

Be it known that I, JOSIAH LEES, gold-chain manufacturer, of Birmingham, in the county of Warwick, England, a subject of Her Britannic Majesty, have invented Improvements in the Manufacture of Swivels, Hooks, and Rings, for attaching and securing watches, chains, or jewelry, parts of which improvements are applicable to key-rings, ear-rings, and other similar articles; and I do hereby declare that the following is a full and exact description of my said invention—that is to say:

This invention consists in making swivels, hooks, and rings with a lock or bolt fastening actuated by a coiled wire or other similar spring.

In the drawings, Figures 1 and 2 represent a ring such as may be commonly used for all the purposes of a split ring. This ring is formed either wholly or partially of tubular metal, or it may be constructed of solid metal, a chamber being formed in a part therein, as shown at Fig. 8, to receive the spring $s$ and metal bolt $t$. Referring again to Figs. 1 and 2, it will be seen that a segment of the circle of the ring is omitted to form an opening $a$, and a bolt $b$ is provided, kept to its work by a small coiled spring at its back to close this opening and complete the circuit of the ring. The nib or stud $d$, secured to the bolt $b$, is for the purpose of withdrawing the bolt by compression of the spring into that part of the ring marked E, and being released the bolt $b$ snaps home, as seen in Fig. 2. When the ring is made of tubular metal, a butt or collar is provided at the rear end of the spring to act as a stop and prevent the spring from receding upon the bolt being pressed back.

Figs. 3 and 4 represent views of a swivel or hook such as is commonly used for connecting a chain to the loop of a watch, but constructed in accordance with these improvements, Fig. 3 showing the swivel or hook open and ready to receive the loop of the watch, and Fig. 4 closed and secure from any chance of the loop accidentally working itself off. This swivel is used similarly to the ring already described, an opening $a$ being left or made in the bow $f$, the bolt $b$ receding into a small tube within the case or shield $g$ when it is desired to withdraw the fastening. The tube into which the bolt recedes is fitted with a collar, a transverse section of which enlarged is represented in Fig. 5. The nib upon this collar fitting the groove upon the bolt, prevents any lateral motion of the bolt.

Figs. 6 and 7 show an ear-ring with a connecting-ring of the description shown at Figs. 1 and 2, with the exceptions that the nib in this instance is placed at the rear instead of the fore end of the bolt and works in a slot $h$, and as the end of the bolt and the meeting end of the ring would be too harsh to be borne by the ear the end of each of those parts is softened or rounded off into a pad or cushion K, and these, by the action of the spring pressing the lobe of the ear, have sufficient power to sustain the weight of the suspended jewel or other ornament, avoiding the necessity of piercing the ear.

What I claim as my invention, and desire to secure by Letters Patent in the manufacture of swivel hooks and rings for attaching and securing watch-chains, ear-rings, key-rings, and other similar articles of jewelry, is—

The so combining of a spring-bolt with the article of jewelry as that said bolt when shot out shall form a part of the rim or boundary of said hook or ring, and thus close the space through or by which the article of jewelry is secured to any other thing, and thus avoid the use of a hinge of any kind, substantially as represented.

JOSIAH LEES.

Witnesses:
J. W. G. UNDERHILL,
EDWARD J. PAYNE.